US012652551B2

(12) United States Patent
McCann et al.

(10) Patent No.: US 12,652,551 B2
(45) Date of Patent: Jun. 9, 2026

(54) SYSTEMS, APPARATUSES, AND METHODS USING COORDINATED TRANSMISSIONS BETWEEN MULTIPLE ACCESS POINTS FOR PROVIDING WLAN VENDOR-SPECIFIC SENSING REPORTS

(71) Applicant: HUAWEI TECHNOLOGIES CO., LTD., Shenzhen (CN)

(72) Inventors: Stephen McCann, Kanata (CA); Michael Montemurro, Kanata (CA); Jung Hoon Suh, Kanata (CA); Yan Xin, Kanata (CA); Osama Aboul-Magd, Kanata (CA); Kwok Shum Au, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 296 days.

(21) Appl. No.: 18/214,120

(22) Filed: Jun. 26, 2023

(65) Prior Publication Data

US 2024/0430703 A1 Dec. 26, 2024

(51) Int. Cl.
*H04W 24/02* (2009.01)
*H04B 7/06* (2006.01)

(52) U.S. Cl.
CPC .......... *H04W 24/02* (2013.01); *H04B 7/0626* (2013.01)

(58) Field of Classification Search
None
See application file for complete search history.

(56) References Cited

U.S. PATENT DOCUMENTS

| | | | | |
|---|---|---|---|---|
| 2015/0341233 A1* | 11/2015 | Marri Sridhar | ....... | H04W 24/10 370/252 |
| 2019/0104431 A1* | 4/2019 | Gunnarsson | .......... | H04W 64/00 |
| 2024/0323727 A1* | 9/2024 | Duan | .................... | G01S 7/2886 |
| 2024/0357653 A1* | 10/2024 | Luo | .................. | H04W 74/0816 |

OTHER PUBLICATIONS

IEEE 802.11bf D0.4, "Draft Standard for Information technology—Telecommunications and information exchange between systems Local and metropolitan area networks—Specific requirements", Nov. 2022.
IEEE 802.11-22/0134r2, "Proposed Draft Text for D0.1: Threshold-based Sensing Procedure", Feb. 2022.
IEEE 802.11-22/0134r4, "Proposed Draft Text for D0.1: Threshold-based Sensing Procedure", Feb. 2022.
IEEE 802.11-21/0351r5, "Threshold based sensing measurement", May 10, 2021.

* cited by examiner

*Primary Examiner* — Walter J Divito
(74) *Attorney, Agent, or Firm* — Tim Tingkang Xia, Esq.; Troutman Pepper Locke LLP

(57) ABSTRACT

A computerized method has the steps of: transmitting a signal for broadcasting a multiple-report-type-support capability, receiving from a device a first request having an indication of the multiple-report-type-support capability, sending to the device a first response having a confirmation of the multiple-report-type-support capability, exchanging information with the device for selecting a report type, and receiving from the device one or more sensing-measurement reports generated using the selected report type.

20 Claims, 10 Drawing Sheets

400

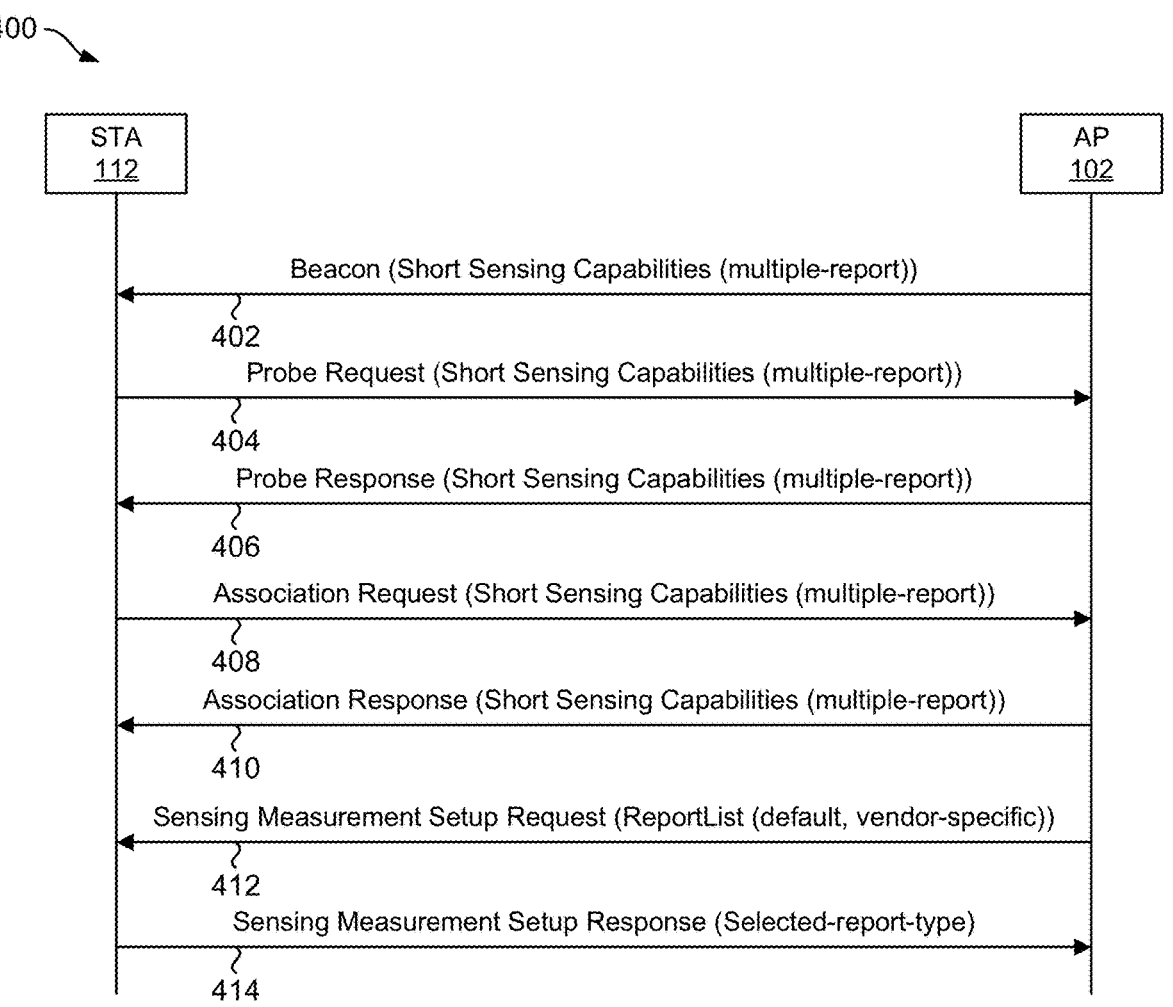

STA
112

AP
102

Beacon (Short Sensing Capabilities (multiple-report))

402

Probe Request (Short Sensing Capabilities (multiple-report))

404

Probe Response (Short Sensing Capabilities (multiple-report))

406

Association Request (Short Sensing Capabilities (multiple-report))

408

Association Response (Short Sensing Capabilities (multiple-report))

410

Sensing Measurement Setup Request (ReportList (default, vendor-specific))

412

Sensing Measurement Setup Response (Selected-report-type)

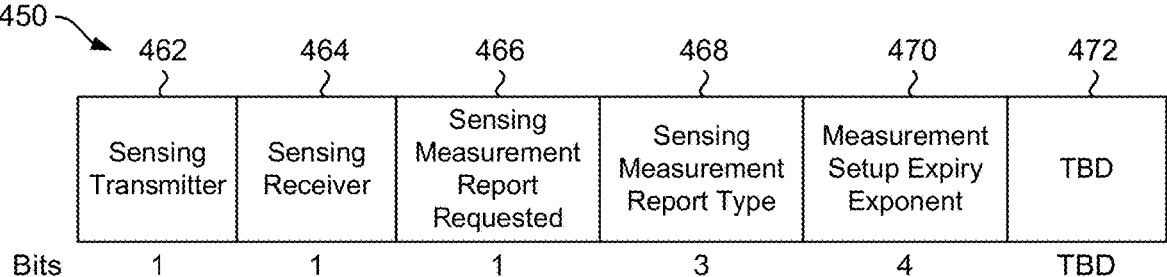

| Sensing Transmitter | Sensing Receiver | Sensing Measurement Report Requested | Sensing Measurement Report Type | Measurement Setup Expiry Exponent | TBD |
|---|---|---|---|---|---|

Bits    1    1    1    3    4    TBD

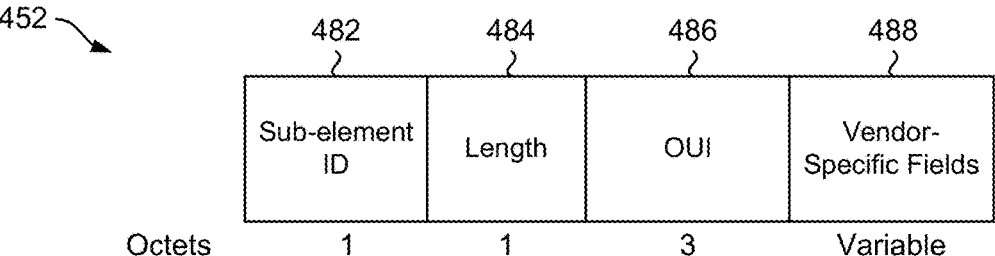

| Sub-element ID | Length | OUI | Vendor-Specific Fields |
|---|---|---|---|

Octets    1    1    3    Variable

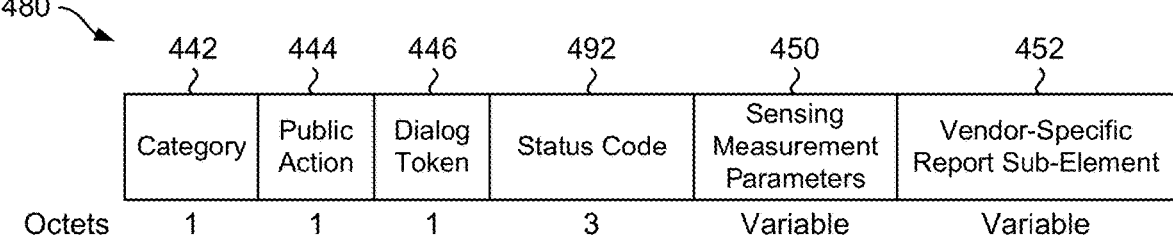

| Category | Public Action | Dialog Token | Status Code | Sensing Measurement Parameters | Vendor-Specific Report Sub-Element |
|---|---|---|---|---|---|

Octets    1    1    1    3    Variable    Variable

| Category | Public Action | Dialog Token | Measurement Setup ID | Sensing Measurement Parameters | List of Report Types |
|----------|---------------|--------------|----------------------|--------------------------------|----------------------|

Octets     1     1     1     3     Variable     Variable

502

512     512     512

| Report Type 1 | Report Type 2 | ... | Report Type n |
|---------------|---------------|-----|---------------|

Octets     variable     variable     variable

512

522     524     526     528     530     532

| Element ID | Length | Element ID Extension | Sensing Measurement Report Type | OUI | Sensing Measurement Report |
|------------|--------|----------------------|---------------------------------|-----|----------------------------|

Octets     1     1     1     1     0 to 3     Variable

450

540

580

SYSTEMS, APPARATUSES, AND METHODS USING COORDINATED TRANSMISSIONS BETWEEN MULTIPLE ACCESS POINTS FOR PROVIDING WLAN VENDOR-SPECIFIC SENSING REPORTS

FIELD OF THE DISCLOSURE

The present disclosure relates generally to wireless systems, apparatuses, and methods, and in particular relates to wireless systems, apparatuses, and methods using coordinated transmissions between multiple access points for providing WLAN vendor-specific sensing reports.

BACKGROUND

Wireless communication systems are known. For example, The IEEE 802.11 standards provide specifications of a wireless local area network (WLAN) for wirelessly connecting a plurality of computing devices to form a wireless computer network within a small area (compared to the so-called "wide area network") such as a home, a school, a building, or the like.

For example, IEEE 802.11bf is a task group within the IEEE 802.11 Wireless LAN project working on an extension standard (an amendment) to enable IEEE 802.11 devices to support WLAN sensing, which enables sensing of:

targets such as objects, humans, animals, and/or the like;
 various features of a target such as range (that is, distance), velocity, angular, motion, presence or proximity, gesture, and/or the like;
 environments such as rooms, houses, vehicles, enterprise or business environment, office/campus facilities, and/or the like.

Therefore, next generation wireless communication systems may include sensing technologies for various uses and benefits.

SUMMARY

According to one aspect of this disclosure, there is provided a computerized method comprising: transmitting a signal for broadcasting a multiple-report-type-support capability; receiving from a device a first request having an indication of the multiple-report-type-support capability; sending to the device a first response having a confirmation of the multiple-report-type-support capability; exchanging information with the device for selecting a report type; and receiving from the device one or more sensing-measurement reports generated using the selected report type.

In some embodiments, the first request is a probe request defined based on an IEEE 802.11 standard, and the first response is a probe response defined based on the IEEE 802.11 standard.

In some embodiments, said exchanging information with the device for selecting the report type comprises: sending a request frame, the request frame comprising one or more sensing-measurement report types; and receiving a response frame, the response frame comprising the report type selected from the one or more sensing-measurement report types.

In some embodiments, the one or more sensing-measurement report types comprise a default sensing-measurement report type and at least one vendor-specific sensing-measurement report type.

In some embodiments, the one or more sensing-measurement report types comprise at least one first sensing-measurement report type associated with a unique ID, and a second sensing-measurement report type unassociated with any ID.

In some embodiments, the request frame comprises a first field, the first field comprising a first predefined value for indicating inclusion of the one or more sensing-measurement report types in the request frame.

In some embodiments, the request frame is a Sensing Measurement Setup Request frame defined based on an IEEE 802.11 standard, and the response frame is a Sensing Measurement Setup Response frame defined based on the IEEE 802.11 standard; the first field is a Sensing Measurement Parameters field defined based on the IEEE 802.11 standard; and the first predefined value is a value of a Sensing Measurement Report Type subfield of the Sensing Measurement Parameters field.

In some embodiments, the first predefined value is 7.

In some embodiments, the request frame comprises a second field, the second field comprising the one or more sensing-measurement report types.

In some embodiments, the second field further comprises: the second field further comprises: a first identifier (ID) having a second predefined value; a length subfield for indicating the length of the second field; and a unique ID.

In some embodiments, the unique ID is an organizationally unique identifier (OUI).

In some embodiments, the second predefined value is 221.

In some embodiments, the second field further comprises one or more subfields, each of the one or more subfields comprising: a second ID; a length item for indicating the length of the subfield; a Sensing Measurement Report Type item; and a Sensing Measurement Parameters.

In some embodiments, the first field further comprises a number count of the one or more subfields of the second field.

In some embodiments, the first predefined value is 6 if the one or more sensing-measurement report types comprise a plurality of sensing-measurement report types, or is 7 if the one or more sensing-measurement report types only comprise a single sensing-measurement report type.

In some embodiments, the response frame comprises a third field, the third field comprising a third predefined value for indicating inclusion of the selected report type in the response frame.

In some embodiments, the one or more sensing-measurement report types comprise a channel state information (CSI) quantization report generated by the device using a procedure comprising: obtaining channel estimation values; normalizing phases of the channel estimation values by x; quantizing normalized phases; normalizing magnitudes of the channel estimation values by a magnitude maximum; and quantizing normalized magnitudes.

According to one aspect of this disclosure, there is provided a module comprising: one or more circuits for performing above-described method.

According to one aspect of this disclosure, there is provided one or more non-transitory, computer-readable storage media comprising computer-executable instructions, wherein the instructions, when executed, cause at least one processing unit to perform above-described method.

The above-described methods, modules, and/or one or more non-transitory computer-readable storage media provide various benefits such as:

The above-described methods allow sensing stations (STAs) to negotiate vendor-specific sensing measurement report types with peer sensing stations (such as other STAs and/or APs), thereby providing flexibility for sensing reporting.

The above-described request and response frames allow sensing nodes (such as sensing STAs and sensing APs) to easily exchange vendor-specific sensing-measurement reports.

The above-described request and response frames allow sensing nodes to exchange a list of sensing-measurement reports including the IEEE 802.11bf default and vendor-specific reports.

The DMG Sensing Measurement Setup Element and DMG Sensing Report Element allows sensing nodes to negotiate vendor-specific DMG sensing-measurement report types.

The CSI quantization report facilitates the negotiation as a vendor-specific option.

BRIEF DESCRIPTION OF THE DRAWINGS

FIG. 11A is a message-flow diagram showing an exemplary message flow for a method of sensing session report negotiation between a sensing initiator and a sensing responder shown in FIG. 9 for establishing an associated sensing session, according to some embodiments of this disclosure;

FIG. 13 is a schematic diagram showing the structure of the Sensing Measurement Parameters field of the sensingmeasurement-setup request frame shown in FIG. 12, according to some embodiments of this disclosure;

FIG. 14 is a schematic diagram showing the structure of the Vendor-Specific Report Sub-Element field of the sensing-measurement-setup request frame shown in FIG. 12, according to some embodiments of this disclosure;

FIG. 15 is a schematic diagram showing the structure of the sensing-measurement-setup response frame used in the message-flow diagram shown in FIG. 11A and/or FIG. 11B, according to some embodiments of this disclosure;

DETAILED DESCRIPTION

Embodiments disclosed herein relate to wireless systems, apparatuses, and methods using coordinated transmissions between multiple access points for providing WLAN vendor-specific sensing reports. Herein, the term "vendor-specific sensing reports" or "vendor-specific sensing-measurement reports" refers to sensing-measurement reports customized by a vendor or a provider of the wireless systems, apparatuses, methods, and/or non-transitory computer-readable storage media comprising computer-executable instructions for implementing the methods. Accordingly, the term the term "vendor-specific report types" or "vendor-specific sensing-measurement report types" refers to sensing-measurement report types customized by a vendor or a provider. In a broad aspect, a vendor's vendor-specific sensing-measurement report and a vendor-specific sensing-measurement report type are associated with the vendor's unique identifier (ID) such as the vendor's organizationally unique identifier (OUI; assigned by the IEEE Registration Authority; see https://standards.ieee.org/products-programs/regauth/oui/).

The wireless systems, apparatuses, and methods disclosed herein may be any suitable systems, apparatuses, and methods for transmitting wireless signals. One example of such systems may be WI-FI® systems (WI-FI is a registered trademark of Wi-Fi Alliance, Austin, TX, USA). Other examples of such systems may be 5G, 6G, or other applicable future wireless mobile communication systems, and the like.

A. System Structure

Figure 1:
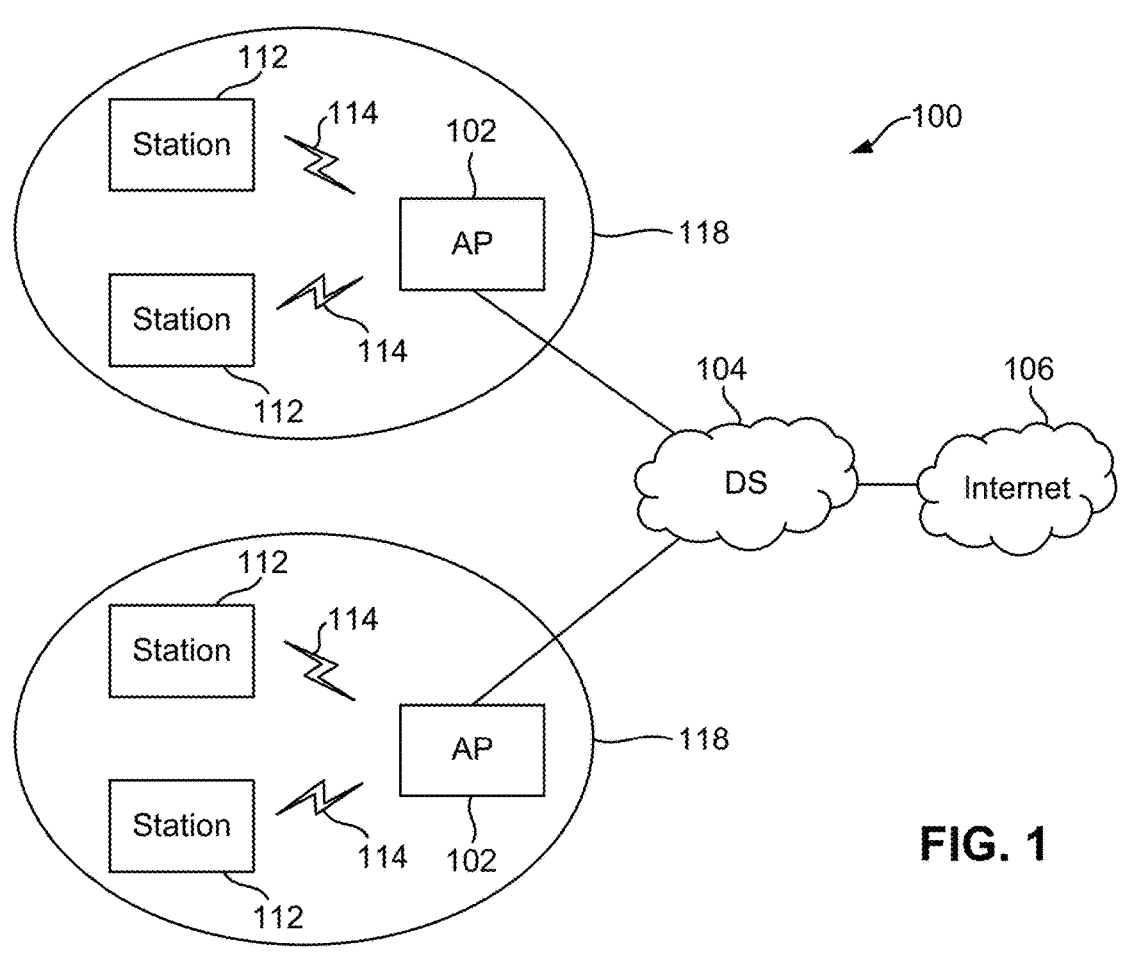
FIG. 1 is a simplified schematic diagram showing a communication system, according to some embodiments of this disclosure.

Turning now to FIG. 1, a communication system according to some embodiments of this disclosure is shown and is generally identified using reference numeral 100. As an example, the communication system 100 in these embodiments may be a WI-FI® system built under relevant standards such as IEEE 802.11 standards. As shown, the communication system 100 comprises one or more interconnected networking devices 102 such as one or more interconnected access points (APs; also called "base stations") forming a distribution system (DS) 104. The DS 104 is in turn connected to other networks such as the Internet 106 which may include a network of computers and subnets (intranets) or both, and incorporate protocols, such as Internet Protocol (IP), Transmission Control Protocol (TCP), User Datagram Protocol (UDP), and/or the like.

Each AP 102 is in wireless communication with one or more mobile or stationary stations (STAs) 112 through respective wireless channels 114 using wireless signals (also identified as 114) transmitted therebetween for providing wireless network connects thereto. Herein, the APs 102 and STAs 112 may be considered as different types of network nodes (also denoted "communication nodes" or simply "nodes") of the communication system 100. Each AP 102 and the STAs 112 connected thereto form a cell or basic service set (BSS) 118.

Figure 2:
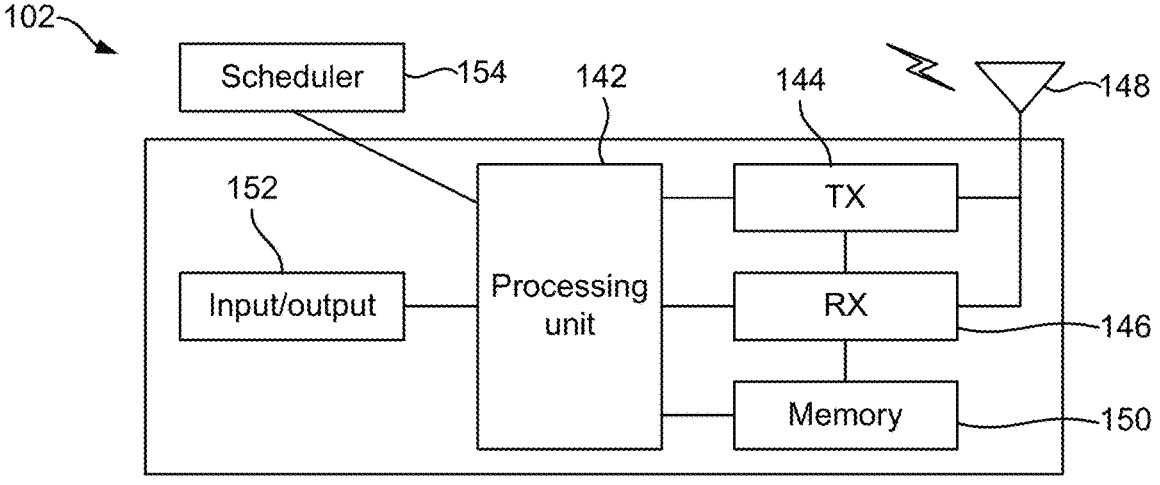
FIG. 2 is a simplified schematic diagram of an access point (AP) of the communication network of the communication system shown in FIG. 1.

FIG. 2 is a simplified schematic diagram of an AP 102. As shown, the AP 102 comprises at least one processing unit 142, at least one transmitter (Tx) 144, at least one receiver (Rx) 146 (collectively referred to as a transceiver), one or more antennas 148, at least one memory 150, and one or more input/output components or interfaces 152. A scheduler 154 may be coupled to the processing unit 142. The scheduler 154 may be included within or operated separately from the AP 102.

The processing unit 142 is a circuit for performing various processing operations such as signal coding, data processing, power control, input/output processing, or any other suitable functionalities. The processing unit 142 may comprise a microprocessor, a microcontroller, a digital signal processor, a FPGA, an ASIC, and/or the like. In some embodiments, the processing unit 142 may execute computer-executable instructions or code stored in the memory 150 to perform various the procedures (otherwise referred to as methods) described below.

Each transmitter 144 may comprise any suitable structure for generating signals, such as control signals as described in detail below, for wireless transmission to one or more STAs 112. Each receiver 146 may comprise any suitable structure for processing signals received wirelessly from one or more STAs 112. Although shown as separate components, at least one transmitter 144 and at least one receiver 146 may be integrated and implemented as a transceiver. Each antenna 148 may comprise any suitable structure for transmitting and/or receiving wireless signals. Although a common antenna 148 is shown in FIG. 2 as being coupled to both the transmitter 144 and the receiver 146, one or more antennas 148 may be coupled to the transmitter 144, and one or more other antennas 148 may be coupled to the receiver 146.

In some embodiments, an AP 102 may comprise a plurality of transmitters 144 and receivers 146 (or a plurality of transceivers) together with a plurality of antennas 148 for communication in its cell 118 using, for example, multiple-input multiple-output (MIMO) technology and/or multi-link operation (MLO). Moreover, orthogonal frequency-division multiplexing (OFDM) may be used wherein the channel 114 is partitioned into a plurality of orthogonal subchannels for communication between the AP 102 and the STA 112.

Each memory 150 may comprise one or more non-transitory, computer-readable, volatile and/or non-volatile storage media such as RAM, ROM, hard disk, optical disc, SIM card, solid-state memory, memory stick, SD memory card, and/or the like. The memory 150 may be used for storing instructions executable by the processing unit 142 and data used, generated, or collected by the processing unit 142. For example, the memory 150 may store instructions of software, software systems, or software modules that are executable by the processing unit 142 for implementing some or all of the functionalities and/or embodiments of the procedures performed by an AP 102 described herein.

Each input/output component 152 enables interaction with a user or other devices in the communication system 100. Each input/output device 152 may comprise any suitable structure for providing information to or receiving information from a user and may be, for example, a speaker, a microphone, a keypad, a keyboard, a display, a touch screen, a network communication interface, and/or the like.

Herein, the STAs 112 may be any suitable wireless device that may join the communication system 100 via an AP 102 for wireless operation. In various embodiments, a STA 112 may be a wireless electronic device used by a human or user (such as a smartphone, a cellphone, a personal digital assistant (PDA), a laptop, a desktop computer, a tablet, a smart watch, a consumer electronics device, and/or the like). A STA 112 may alternatively be a wireless sensor, an Internet-of-things (IoT) device, a robot, a shopping cart, a vehicle, a smart TV, a smart appliance, a wireless transmit/receive unit (WTRU), a mobile station, or the like. Depending on the implementation, the STA 112 may be movable autonomously or under the direct or remote control of a human, or may be positioned at a fixed position.

In some embodiments, a STA 112 may be a multimode wireless electronic device capable of operation according to multiple radio access technologies and incorporate multiple transceivers necessary to support such.

In addition, some or all of the STAs 112 comprise functionality for communicating with different wireless devices and/or wireless networks via different wireless links using different wireless technologies and/or protocols. Instead of wireless communication (or in addition thereto), the STAs 112 may communicate via wired communication channels to other devices or switches (not shown), and to the Internet 106. For example, a plurality of STAs 112 (such as STAs 112 in proximity with each other) may communicate with each other directly via suitable wired or wireless sidelinks.

Figure 3:
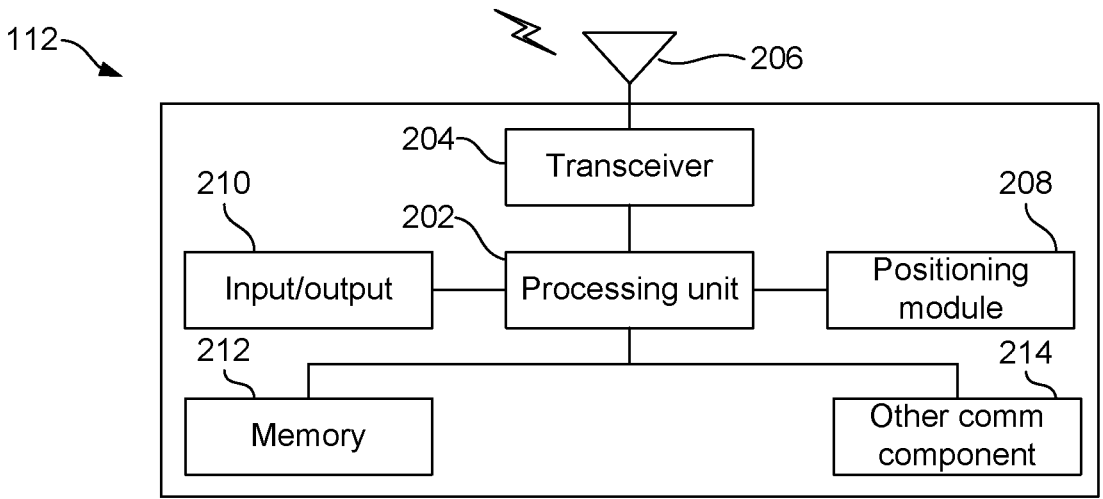
FIG. 3 is a simplified schematic diagram of a station (STA) of the communication system shown in FIG. 1.

FIG. 3 is a simplified schematic diagram of a STA 112. As shown, the STA 112 comprises at least one processing unit 202, at least one transceiver 204, at least one antenna or network interface controller (NIC) 206, at least one positioning module 208, one or more input/output components 210, at least one memory 212, and at least one other communication component 214.

The processing unit 202 is a circuit for performing various processing operations such as signal coding, data processing, power control, input/output processing, or any other functionalities to enable the STA 112 to access and join the communication system 100 and operate therein. The processing unit 202 may also be configured to implement some or all of the functionalities of the STA 112 described in this disclosure. The processing unit 202 may comprise a central processing unit (CPU), a microprocessor, a microcontroller, a digital signal processor, an accelerator, a graphic processing unit (GPU), a tensor processing unit (TPU), a FPGA, or an ASIC. Examples of the processing unit 202 may be an ARM® microprocessor (ARM is a registered trademark of Arm Ltd., Cambridge, UK) manufactured by a variety of manufactures such as Qualcomm of San Diego, California, USA, under the ARM® architecture, an INTEL® microprocessor (INTEL is a registered trademark of Intel Corp., Santa Clara, CA, USA), an AMD® microprocessor (AMD is a registered trademark of Advanced Micro Devices Inc., Sunnyvale, CA, USA), and the like. In some embodiments, the processing unit 202 may execute computer-executable instructions or code stored in the memory 212 to perform various processes described below.

The at least one transceiver 204 may be configured for modulating data or other content for transmission by the at least one antenna 206 to communicate with an AP 102. The transceiver 204 is also configured for demodulating data or other content received by the at least one antenna 206. Each transceiver 204 may comprise any suitable structure for generating signals for wireless transmission and/or processing signals received wirelessly. Each antenna 206 may comprise any suitable structure for transmitting and/or receiving wireless signals. Although shown as a single functional unit, a transceiver 204 may be implemented separately as at least one transmitter and at least one receiver.

The positioning module 208 is configured for communicating with a plurality of global or regional positioning devices such as navigation satellites for determining the location of the STA 112. The navigation satellites may be satellites of a global navigation satellite system (GNSS) such as the Global Positioning System (GPS) of USA, Global'naya Navigatsionnaya Sputnikovaya Sistema (GLONASS) of Russia, the Galileo positioning system of the European Union, and/or the Beidou system of China. The navigation satellites may also be satellites of a regional navigation satellite system (RNSS) such as the Indian Regional Navigation Satellite System (IRNSS) of India, the Quasi-Zenith Satellite System (QZSS) of Japan, or the like. In some other embodiments, the positioning module 208 may be configured for communicating with a plurality of indoor positioning device for determining the location of the STA 112.

The one or more input/output components 210 are configured for interaction with a user or other devices in the communication system 100. Each input/output component 210 may comprise any suitable structure for providing information to or receiving information from a user and may be, for example, a speaker, a microphone, a keypad, a keyboard, a display, a touch screen, and/or the like.

The at least one memory 212 is configured for storing instructions executable by the processing unit 202 and data used, generated, or collected by the processing unit 202. For example, the memory 212 may store instructions of software, software systems, or software modules that are executable by the processing unit 202 for implementing some or all of the functionalities and/or embodiments of the STA 112 described herein. Each memory 212 may comprise one or more non-transitory, computer-readable, volatile and/or non-volatile storage media and retrieval components such as RAM, ROM, hard disk, optical disc, SIM card, solid-state memory modules, memory stick, SD memory card, and/or the like.

The at least one other communication component 214 is configured for communicating with other devices such as other STAs 112 via other communication means such as a radio link, a BLUETOOTH® link (BLUETOOTH is a registered trademark of Bluetooth Sig Inc., Kirkland, WA, USA), a wired sidelink, and/or the like. Examples of the wired sidelink may be a USB cable, a network cable, a parallel cable, a serial cable, and/or the like.

In some embodiments, a STA 112 may comprise a plurality of transceivers 204 and a plurality of antennas 206 for communication with an AP 102 using, for example, MIMO or MLO technology. A STA 112 may also use OFDM for communication with the AP 102.

In the following, the APs 102 and STAs 112 are generally classified as initiators and responders, wherein an AP 102 may be an initiator when it is transmitting a wireless signal or a responder when it is receiving a wireless signal. Similarly, a STA 112 may be an initiator when it is transmitting a wireless signal or a responder when it is receiving a wireless signal. In some embodiments two STAs 112 may operate as an initiator and a responder, respectively. Alternatively, two APs 102 may operate as an initiator and a responder, respectively.

As those skilled in the art understand, the channel 114 between an AP 102 and a STA 112 generally comprises one or more Tx-Rx links (also called "Tx-Rx link pairs") each corresponding to a pair of Tx and Rx. Depending on the communication direction, the Tx and Rx may be respectively on the AP and STA sides or may be respectively on the STA and AP sides.

The channel 114 may be estimated by sending a set of predefined symbols (as the Reference Signal (RS)) from an initiator (which may be the AP 102 or the STA 112) to a responder (which may accordingly be the STA 112 or the AP 102). The responder uses the received symbols and the predefined symbols to estimate the parameters of the channel 114 and feedback the estimated channel parameters to the initiator as the channel station information (CSI). In 802.11 standards, channel state information (CSI) is also used to support beamforming.

B. Target Sensing

In some embodiments of this disclosure, the communication system 100 or sensing-capable communication nodes thereof (such as sensing-capable APs 102 and/or sensing-capable STAs 112) may use the wireless communication signals 114 for sensing targets and/or understanding the environment for various purposes. In this subsection, the sensing-capable communication nodes, sensing-capable APs 102, and sensing-capable STAs 112 may be denoted "sensing nodes" (or simply "nodes"), "sensing APs" (or simply "APs"), and "sensing STAs" (or simply "STAs"), respectively, for ease of description.

In this subsection, various embodiments are described with respect to IEEE 802.11 standard such as IEEE 802.11bf. The details of IEEE 802.11bf may be found in "IEEE P802.11bf™/D0.4, Draft Standard for Information technology—Telecommunications and information exchange between systems Local and metropolitan area networks—Specific requirements," published by the IEEE in November 2022; IEEE 802.11-21/0351r5, "Threshold Based Sensing Measurement," published on May 10, 2021, and accessible at https://mentor.ieee.org/802.11/dcn/21/11-21-0351-05-00bf-threshold-based-sensing-measurement.pptx; and IEEE 802.11-22/0134r4, "Proposed Draft Text for D0.1: Threshold-based Sensing Procedure," published on Feb. 24, 2022, and accessible at https://mentor.ieee.org/802.11/dcn/22/11-22-0134-02-00bf-pdt-threshold-based-sensing-procedure.docx; the content of each of which is incorporated herein by reference in its entirety.

Figure 4:
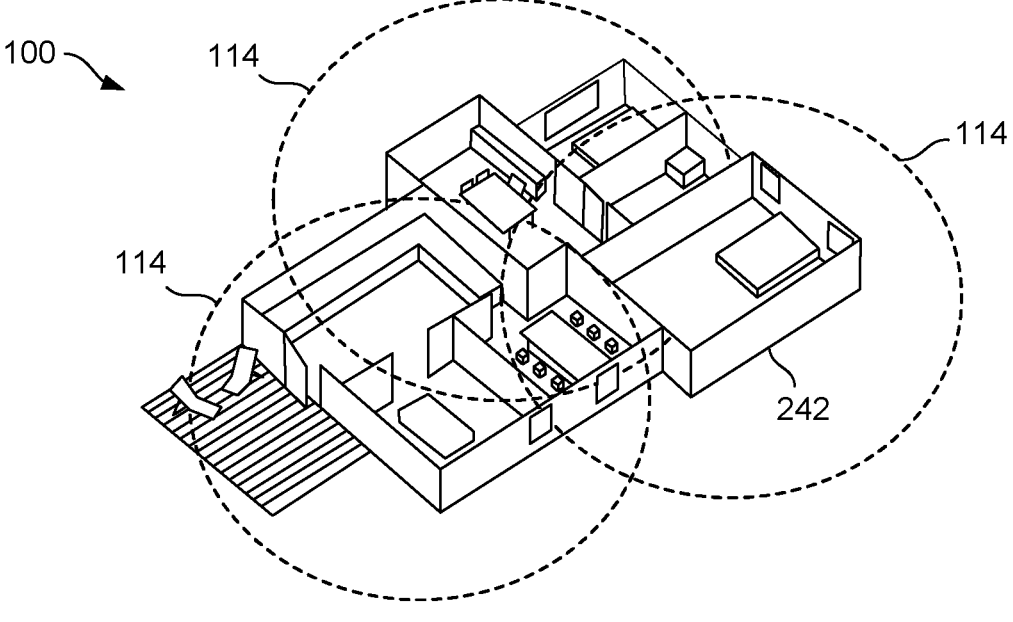
FIG. 4 is a simplified schematic diagram showing the wireless communication system shown in FIG. 1 providing wireless communication signals for covering a home.
Figure 5:
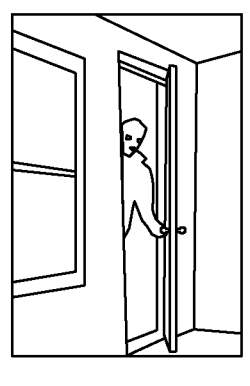
FIG. 5 is an illustration showing using the wireless communication signals of the wireless communication system shown in FIG. 1 for intruder detection.
Figure 6:
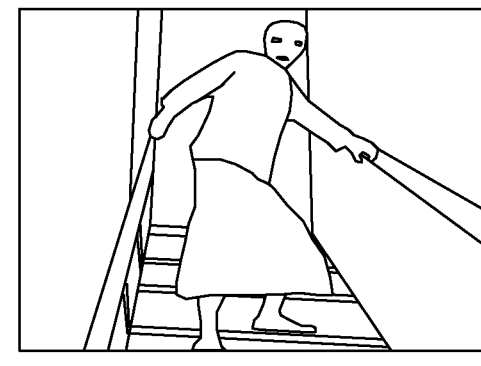
FIG. 6 is an illustration showing using the wireless communication signals of the wireless communication system shown in FIG. 1 for falling detection.
Figure 7A:
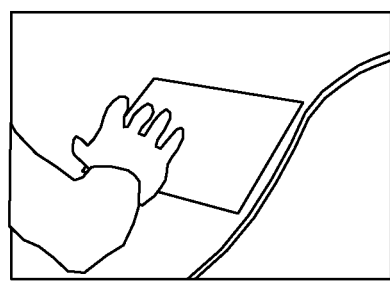
FIGS. 7A and 7B are illustrations showing using the wireless communication signals of the wireless communication system shown in FIG. 1 for gesture recognition.
Figure 7B:
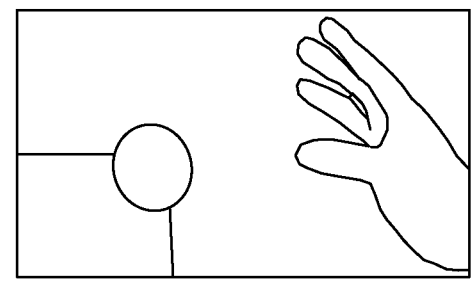
Figure 8:
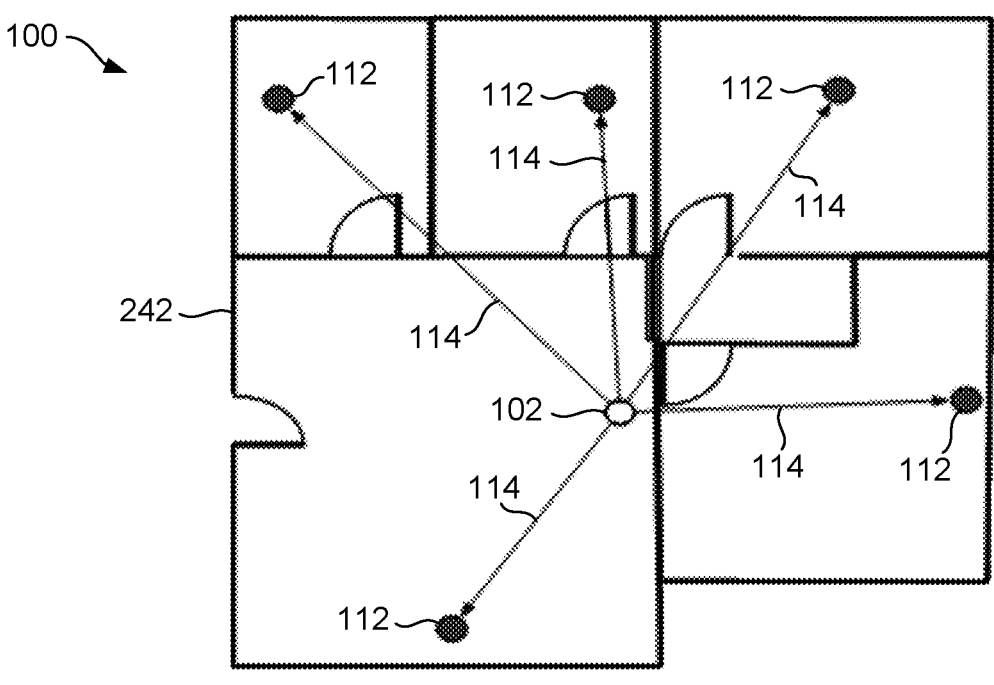
FIG. 8 is simplified schematic diagram showing using the wireless communication signals of the wireless communication system shown in FIG. 1 for layout analysis.

FIGS. 4 to 8 show some sensing examples. As shown in FIG. 4, the communication system 100 may provide wireless communication signals 114 covering a home 242. As shown in FIGS. 5 to 8, one or more sensing-capable STAs 112 (not shown) may use the wireless communication signals 114 for intruder detection (for example, for detecting an intruder; see FIG. 5), for falling detection (for example, for detecting falling of a person; see FIG. 6), for gesture recognition (for example, for recognizing a gesture performed by a person; see FIGS. 7A and 7B), or for layout analysis (for example, analyzing the layout of the home 242 using the wireless communication signals 114 transmitted between an AP 102 and a plurality of STAs 112; see FIG. 8).

Figure 9:
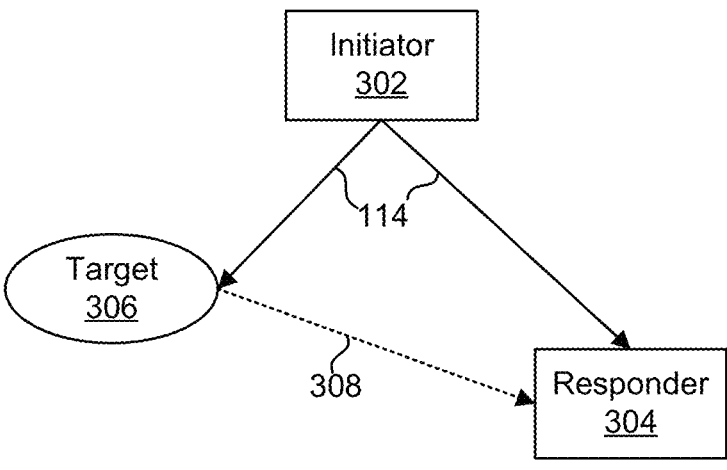
FIG. 9 is a schematic diagram showing an example of sensing a target using two sensing-capable communication nodes of the wireless communication system shown in FIG. 1.

FIG. 9 is a schematic diagram showing an example of sensing a target 306. As shown, a sensing initiator 302 (which is a Tx node suitable or otherwise capable of transmitting a wireless communication signal 114 for sensing) transmits a wireless communication signal 114 which comprises, for example protocol packet data units (PPDUs) for sensing measurements. A sensing responder 304 (which is a Rx node suitable or otherwise capable of receiving the wireless communication signal 114 and performing measurements for sensing) receives the wireless communication signal 114 (or more specifically, the PPDUs) and an echo 308 thereof reflected from a nearby target 306. The sensing responder 304 may detect and measure the received wireless communication signal 114 and/or the echo 308, and report the measured parameters thereof to the sensing initiator 302. Alternatively, the sensing responder 304 may detect and measure the received wireless communication signal 114 and/or the echo 308, and may further measure the parameters of the target 306 (such as azimuth, size, velocity, and/or the like) based on the received wireless communication signal 114 and/or the echo 308 thereof, and then reports the detected target 306 and the parameters thereof to the sensing initiator 302. In the following, the term "measurements" or "measurement results" is used which generally refers to the measured parameters of the received wireless communication signal 114, one or more measured parameters of the echo 308, and/or one or more measured parameters of the target 306. In some embodiments, multiple echoes 308 may be received.

Figure 10:
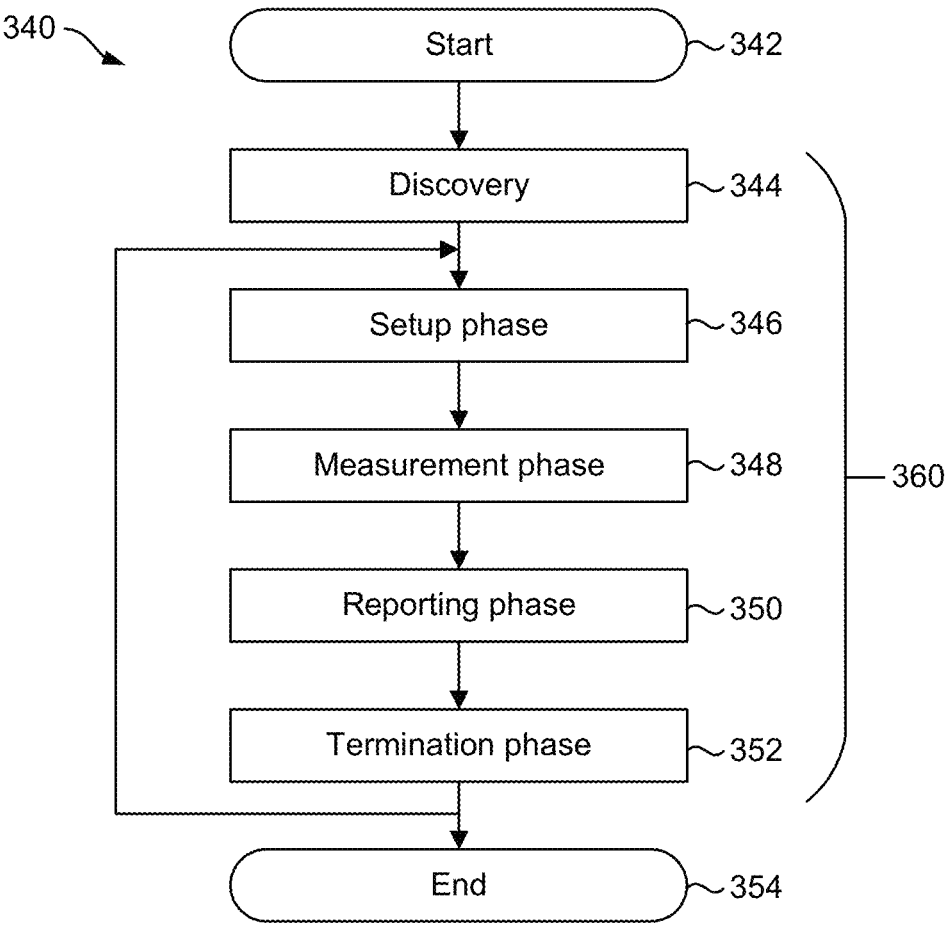
FIG. 10 is a flowchart showing the sensing procedure specified by IEEE 802.11bf.

FIG. 10 is a flowchart showing the sensing procedure 340 (also called the "sensing protocol") specified by IEEE 802.11bf. As shown, the sensing procedure 340 comprises a plurality of phases. More specifically, after the procedure 340 starts (step 342), the sensing procedure 340 enters the sensing-discovery phase 344 for discovering sensing nodes (such as sensing initiators 302 and sensing responders 304) by exchanging information of sensing capabilities between various communication nodes. In some embodiments, the initiator 302 and the responder 304 may be associated with each other after the discovery phase.

After sensing discovery 344, a sensing session 360 starts wherein the sensing procedure 340 enters the sensing setup phase 346 for setting-up or otherwise initializing the sensing session. In this phase, a threshold parameter may be transmitted from the initiator to the responder within a Sensing Request frame. The threshold allows receivers to determine when receiver CSI variations indicate the detection of objects.

A sensing initiator 302 then starts to transmit the wireless communication signal 114. For example, the sensing initiator 302 may transmit a series of m null data packet (NDP) frames (as part of the PPDU frame). A sensing responder 304 receives the NDP frames of the wireless communication signal 114 and/or the echoes thereof as shown in FIG. 9.

In the sensing measurement phase 348, the sensing responder 304 calculates the CSI per NDP frame and performs the measurements such as:

the CSI amplitude per symbol per frame; and the CSI phase per symbol per frame.

In some embodiments, the CSI amplitude and phase are determined per NDP frame.

In the sensing reporting phase 350, the sensing responder 304 feeds back the measurement results to the sensing initiator 302. For example, the sensing responder 304 may construct a sensing report based on the CSI feedback and transmits the sensing report to the sensing initiator 302.

Then, the sensing session 360 is explicitly or implicitly terminated (the termination phase 352).

The sensing session 360 (which includes the phases 344 to 352) may be repeated as needed. The sensing procedure 340 is ended (step 354) once all sensing sessions 360 are completed.

In target sensing using the wireless communication signal 114, the communication system 100 needs to address several issues and/or design considerations.

For example, the received wireless communication signal 114 and/or the echo 308 thereof may be impacted by the wireless communication channel. Therefore, the CSI may be used as an input to sensing. In some use cases, the CSI may vary over time and therefore for use cases such as intruder detection, the sensing may need a regular CSI feedback. The CSI feedback over a period may be highly correlated.

Moreover, some wireless communication standards such as IEEE 802.11bf may allow devices such as APs 102 and/or STAs 112 to work on sensing technology within various frequency bands such as the 2.4 gigahertz (GHz), 5 GHZ, and 6 GHz bands (collectively denoted sub 7 GHz), and the 60 GHz millimetric band (also known as directional multi-gigabit (DMG)). Due to historical IEEE 802.11 work, separate frame types have been defined for sub 7 GHZ and DMG CSI measurements.

Some standards such as IEEE 802.11 allow vendor-specific protocol elements, such that vendors may build extensions on the IEEE 802.11 standards without having to modify the IEEE 802.11 standards.

In IEEE 802.11i, the authentication and key management (AKM) mechanism includes an OUI) to allow AKMs to be defined outside of the IEEE 802.11 standards. The OUI is always included in the AKM advertisement.

AKMs defined in the IEEE 802.11 standards use the OUI assigned to the IEEE 802.11 working group (00-OF-AC). Other organizations such as the WI-FI Alliance have defined AKMs for WI-FI® protected access (WPA) (00-50-F2) and WI-FI® easy connect network introduction (50-6F-9A). The use of OUIs in certain protocol elements in the IEEE 802.11 standards allows other organizations (not necessarily vendors) to provide standardization without modifying the IEEE 802.11 standard itself.

However, there are cases where the standardized sensing reports defined in IEEE 802.11bf may not be applicable to a sensing application. A vendor or other standards organization may need to define alternative reports to address specific sensing applications.

With the current IEEE 802.11bf amendment, it may have to be updated each time a new sensing report method is defined. Currently there is only one CSI report defined for the sub 7 GHz sensing and one defined for DMG sensing in 802.11bf, although DMG also defines six (6) other (non-CSI) report types.

In view of above-described issues and/or design considerations, the communication system 100 in some embodiments provides a mechanism supporting additional reporting methods and allowing the sensing initiator 302 and sensing responder 304 to negotiate the reporting method as part of sensing measurement setup 346. This mechanism involves the modification of the sensing discovery 344, sensing setup 346, sensing measurement 348, and/or sensing reporting 350 to allow sensing nodes to negotiate alternative reporting mechanisms.

More specifically, the communication system 100 advertises or otherwise broadcasts to all sensing nodes various sensing-measurement report types such as a default or standardized sensing-measurement report type and vendor-specific sensing-measurement report types that may be used by the sensing nodes. During the sensing setup phase 346, the initiator 302 and responder 304 negotiate the type of sensing report to be used to report sensing measurements. During the sensing reporting phase 350, the responder 304 may signal the report type along with necessary parameters and results.

FIG. 11A is a message-flow diagram showing an exemplary message flow 400 for a method of sensing session report negotiation between a sensing initiator 302 (such as an AP 102) and a sensing responder 304 (such as a STA 112) for establishing an associated sensing session. Those skilled in the art will appreciate that the diagram shown in FIG. 11A is only an example of a sequence of messages. Messages may be sent in a different order in other embodiments.

At step 402, the AP 102 advertises or otherwise broadcasts its multiple-report capability (also denoted "multiple-report-type-support capability", that is, the capability of supporting a plurality of sensing-measurement report types) by sending a short-sensing-capabilities element via a beacon to one or more STAs such as the STA 112 for sensing discovery 344. In these embodiments, the AP 102 supports multiple vendor-specific sensing-measurement report types. Therefore, the AP 102 includes an indication (multiple-report) in the short-sensing-capabilities element to indicate that it has the multiple-report-type-support capability to support alternative (such as vendor-specific) reporting methods in addition to the default report type (such as CSI report).

The STA 112 receives the beacon and discovers the AP 102. Then, the STA 112 sends a probe request (step 404), wherein the probe request includes a short-sensing-capabilities element having an indication (multiple-report) to signal that it has the multiple-report-type-support capability (that is, supporting multiple report types (although not necessarily the same report types as the AP 102), which may include an alternative reporting method or type). The AP 102 then responds to the STA 112 with a probe response with a multiple-report indication (step 406). After step 406, the AP 102 and the STA 112 are discovered by each other.

Before setting up the sensing session, the STA 112 then determines whether to set up an unassociated sensing session or to set up an associated sensing session. As those skilled in the art will appreciate, an unassociated sensing session may involve an unsecured communication link therebetween, and/or such an unsecured communication link may only be used for reporting sensing measurements. On the other hands, an associated sensing session establishes a security association (SA) between the STA 112 and the AP 102 that involves a secured communication link therebetween, and/or the secured communication link may be used for reporting sensing measurements and for network connection (that is, use for both reporting sensing measurements and conventional wireless data communication).

As shown in FIG. 11A, the STA 112 determines to set up an associated sensing session. Thus, at step 408, the STA 112 sends to the AP 102 an association request (having a short-sensing-capabilities element with an indication (multiple-report) to signal that it supports multiple reporting types) to request for association. In response, the AP 102 sends to the STA 112 an association response (having a short-sensing-capabilities element with an indication (multiple-report) to signal that it supports multiple reporting types) to establish a secured communication link between the AP 102 and the STA 112 for reporting sensing measurements and for network connection (step 410).

At step 412, the AP 102 sends to the STA 112 a sensing-measurement-setup request frame for negotiating a sensing-measurement report type, wherein the sensing-measurement-setup request frame includes a list of report types that the AP 102 supports. The list of reports may comprise the default report type and alternative report types.

The STA 112 receives the sensing-measurement-setup request frame, chooses a report type from the list of report types received from the AP 102, and sends to the AP 102 a sensing-measurement-setup response frame with a parameter (Selected-report-type) to notify the AP 102 regarding the report type it has chosen to use. The sensing session report negotiation between the AP 102 and STA 112 is then completed. The STA 112 then sensing one or more targets using the wireless communication signal 114, generates one or more sensing-measurement reports using the selected report type, and sends the one or more sensing-measurement reports to the AP 102 (step 414).

In some embodiments, the AP 102 may include a single report type in the sensing-measurement-setup request frame at step 412. The requested report type may be either the default report type or a vendor-specific report type identified by an OUI. After receiving the sensing-measurement-setup request frame, the STA 112 may accept the report type and start a sensing session, or may reject the report type (if, for example, the STA 112 does not support this report type). In some embodiments, the AP 102 may include a plurality of report types in the sensing-measurement-setup request frame at step 412, and the STA 112 may respond with one or more report types in the sensing-measurement setup response step 414 to inform the AP 102 the report types it may use.

Figure 11B:
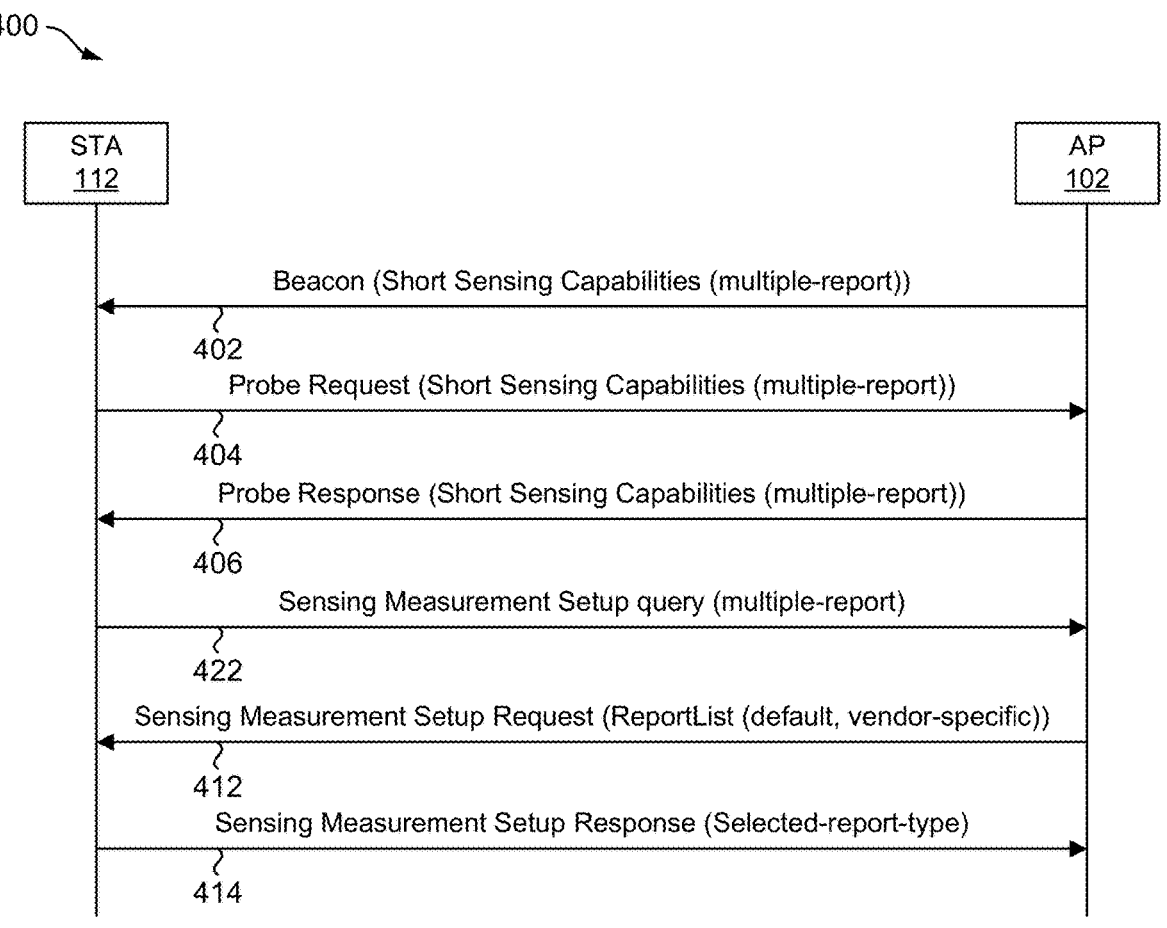
FIG. 11B is a message-flow diagram showing an exemplary message flow for a method of sensing session report negotiation between a sensing initiator and a sensing responder shown in FIG. 9 for establishing an unassociated sensing session, according to some embodiments of this disclosure.

FIG. 11B is a message-flow diagram showing an exemplary message flow 400 for a method of sensing session report negotiation between a sensing initiator 302 (such as an AP 102) and a sensing responder 304 (such as a STA 112) for establishing an unassociated sensing session. Those skilled in the art will appreciate that the diagram shown in FIG. 11B is only an example of a sequence of messages. Messages may be sent in a different order in other embodiments.

The message flow 400 shown in FIG. 11B for establishing an unassociated sensing session is similar to that shown in FIG. 11A for establishing an associated sensing session, except that message flow 400 shown in FIG. 11B does not comprise steps 408 and 410. Instead, the message flow 400 shown in FIG. 11B comprises a step 422 performed after step 406, in which the STA 112 sends a Sensing Measurement Setup query (with an indication (multiple-report) to signal that it supports multiple reporting types). The AP 102 responds the query with a sensing measurement setup request (step 412) as described above.

The method for sensing session report negotiation allow sensing STAs 112 to negotiate vendor-specific sensing measurement report types with peer sensing stations (such as other STAs 112 and/or sensing APs 102), thereby providing flexibility for sensing reporting.

Moreover, in above embodiments, the AP 102 provides a list of sensing-measurement report types at step 412 for the STA 112 to select (step 414). Therefore, the AP 102 may provide compatibility to various vendor-specific report types and remove the STAs 112 from the duty of providing such compatibility, thereby facilitating the design of compact and/or light-weight STAs 112 (such as IoT devices).

Those skilled in the art will appreciate that, in some other embodiments, the STA 112 may perform step 412 to provide a list of sensing-measurement report types for the AP 102 to select (via performing step 414).

As described above, the sensing measurement setup involves a sensing-measurement-setup request frame and a sensing-measurement-setup response frame (collectively denoted "sensing-measurement-setup frames"). In some embodiments, the two sensing-measurement-setup frames may comprise vendor-specific reporting information.

Figure 12:
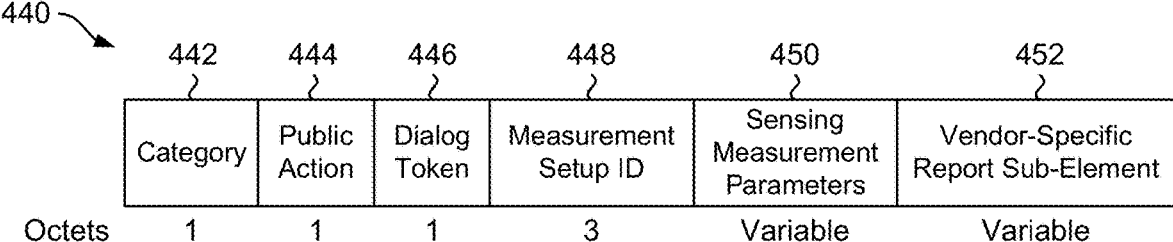
FIG. 12 is a schematic diagram showing the structure of the sensing-measurement-setup request frame used in the message-flow diagram shown in FIG. 11A and/or FIG. 11B, according to some embodiments of this disclosure.

For example, FIG. 12 is a schematic diagram showing the structure of the sensing-measurement-setup request frame 440, according to some embodiments of this disclosure. In this example, the sensing-measurement-setup request frame 440 is in accordance with IEEE 802.11bf clause 9.6.7.49 with modifications.

As shown, the sensing-measurement-setup request frame 440 comprises a Category field 442 (one (1) octet or eight (8) bits), a Public Action field 444 (one (1) octet), a Dialog Token field 446 (one (1) octet), a Measurement Setup ID field 448 (three (3) octets), and a Sensing Measurement Parameters field 450 (variable size), and a Vendor-Specific Report Sub-Element field 452 (variable size) for specifying one or more vendor-specific report types (described in more detail later). The Category field 442, Public Action field 444, Dialog Token field 446, and Measurement Setup ID field 448 are the same as those defined in IEEE 802.11-2020 and IEEE 802.11bf. The Sensing Measurement Parameters field 450 is similar to that defined in IEEE 802.11bf but with new values for indicating the inclusion of vendor-specific report types.

FIG. 13 is a schematic diagram showing the structure of the Sensing Measurement Parameters field 450 of the sensing-measurement-setup request frame 440, according to some embodiments of this disclosure. In this example, the Sensing Measurement Parameters field 450 is in accordance with IEEE 802.11bf, FIG. 9-1002ax with modifications.

As shown in FIG. 13, the Sensing Measurement Parameters field 450 comprises a Sensing Transmitter subfield 462 (one (1) bit), a Sensing Receiver subfield 464 (one (1) bit), a Sensing Measurement Report Requested subfield 466 (one (1) bit), a Sensing Measurement Report Type subfield 468 (three (3) bits), and a Measurement Setup Expiry Exponent subfield 470 (four (4) bits). The Sensing Measurement Parameters field 450 may also comprise other subfields (indicated as "TBD—To Be Determined" 472 in FIG. 13). The Sensing Transmitter subfield 462, Sensing Receiver subfield 464, Sensing Measurement Report Requested subfield 466, and Measurement Setup Expiry Exponent subfield 470 are the same as those defined in IEEE 802.11bf. The Sensing Measurement Report Type subfield 468 is similar to that defined in IEEE 802.11bf but with new value for indicating the inclusion of vendor-specific report types. The TBD subfield 472 is similar to that defined in IEEE 802.11bf but may be extended in some embodiments.

In addition to the sensing measurement types specified in IEEE 802.11bf, the Sensing Measurement Report Type subfield 468 in these embodiments may be set to a new, specific value (such as seven (7) or binary "111") for indicating the inclusion of vendor-specific reports in the sensing-measurement-setup request frame 440. Table 1 shows the Sensing Measurement Report Type subfield 468 in these embodiments, wherein values 0-6 correspond to those listed in IEEE 802.11bf, Table 9-401r (with value zero (0) indicating CSI, and values 1 to 6 reserved), and value 7 is the new, specific value for indicating the use of a vendor-specific report. Of course, in some other embodiments, another suitable value (such as any one of the reserved values 1 to 6) may be used for indicating the use of a vendor-specific report.

TABLE 1

| Sensing Measurement Report Types | |
| --- | --- |
| Value | Sensing Measurement Type |
| 0 | CSI |
| 1-6 | Reserved |
| 7 | Vendor-Specific |

In some embodiments where a single or plurality of vendor-specific report types are used, the STA 112 may set the Sensing Measurement Report Type subfield 468 of the Sensing Measurement Parameters field 450 in the sensing-measurement-setup request frame 440 to the specific value (such as seven (7)) to indicate that vendor-specific report types may be used, and affix a Vendor-Specific Report Sub-Element field 452 (described in more detail later) to the end of the sensing-measurement-setup request frame 440 for specifying one or more vendor-specific report types.

FIG. 14 is a schematic diagram showing the structure of the Vendor-Specific Report Sub-Element field 452, according to some embodiments of this disclosure. As shown, the Vendor-Specific Report Sub-Element field 452 comprises a Sub-Element ID subfield 482 (one (1) octet) which may be set to a predefined value (such as value 221) for indicating that the Sensing Type is vendor-specific (that is, a vendor-specific report is specified; described in more detail below), a Length subfield 484 (one (1) octet) indicating the length of the Vendor-Specific Report Sub-Element field 452, an OUI subfield 486 (three (3) octets) specifying the vendor's OUI, and one or more vendor-specific subfields 488 (variable size) for the vendor associated with the OUI to store information related to vendor-specific report types. For example, the one or more vendor-specific subfields 488 may comprise a Vendor Reports Type field in some embodiments wherein the vendor may define multiple report types. Any other report-specific parameters defined by the vendor may be included in the one or more vendor-specific subfields 488.

FIG. 15 is a schematic diagram showing the structure of the sensing-measurement-setup response frame 480, according to some embodiments of this disclosure. In this example, the sensing-measurement-setup response frame 480 is in accordance with IEEE 802.11bf clause 9.6.7.50 with modifications.

As shown, the sensing-measurement-setup response frame 480 comprises a Category field 442 (one (1) octet), a Public Action field 444 (one (1) octet), a Dialog Token field 446 (one (1) octet), a Status Code field 492 (three (3) octets), a Sensing Measurement Parameters field 450 (variable length), and a Vendor-Specific Report Sub-Element field 452 for specifying one or more vendor-specific report types. The Category field 442, Public Action field 444, Dialog Token field 446, and Status Code field 492 are the same as those defined in IEEE 802.11bf. The Sensing Measurement Parameters field 450 is similar to that defined in IEEE 802.11bf but with new values for indicating the inclusion of vendor-specific report types.

The Category field 442, Public Action field 444, Dialog Token field 446, Sensing Measurement Parameters field 450, and Vendor-Specific Report Sub-Element field 452 are similar to those of the sensing-measurement-setup request frame 440 shown in FIG. 12. For example, Sensing Measurement Parameters field 450 may comprise a Sensing Measurement Report Type which may be set to value 7 for indicating the inclusion of vendor-specific report type, and the Vendor-Specific Report Sub-Element field 452 may comprise the selected vendor-specific report type.

In above embodiments, the Vendor-Specific Report Sub-Element is a field 452 of the sensing-measurement-setup request frame 440 and the sensing-measurement-setup response frame 480. In some embodiments, the Vendor-Specific Report Sub-Element may be included as a sub-element or subfield of the Sensing Measurement Parameters field 450 of the sensing-measurement-setup request frame 440 and/or the sensing-measurement-setup response frame 480 (for example, in the "TBD" subfields 472 shown in FIG. 13).

With above-described structures of the sensing-measurement-setup request frame 440 and the sensing-measurement-setup response frame 480, the sensing nodes may easily exchange vendor-specific sensing-measurement reports.

In some embodiments, the sensing-measurement-setup frames 440 and 480 may comprise a list of sensing measurement report types, such as both the IEEE 802.11bf default report type and vendor-specific report types such as those indicated in Table 1.

In these embodiments, the message flow may be similar to that shown in FIG. 11A or 11B (depending on whether to establish an associated sensing session or an unassociated sensing session), wherein the STA 112 indicates a list of multiple report-types in the sensing-measurement-setup request frame 440. The AP 102 selects a report type from the list and responds with the information in the sensing-measurement-setup response frame 480.

Figure 16:
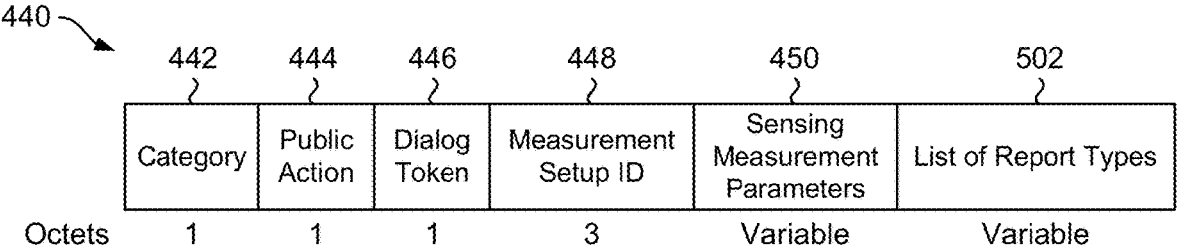
FIG. 16 is a schematic diagram showing the structure of the sensing-measurement-setup request frame used in the message-flow diagram shown in FIG. 11A and/or FIG. 11B, according to some embodiments of this disclosure.

FIG. 16 is a schematic diagram showing the structure of the sensing-measurement-setup request frame 440 in these embodiments. The sensing-measurement-setup request frames 440 is similar to that shown in FIG. 12 except that the sensing-measurement-setup request frames 440 in these embodiments does not comprise a Vendor-Specific Report Sub-Element field 452, and rather comprises a simplified, List of Report Types field 502 for listing one or more sensing-measurement report types.

Figure 17:
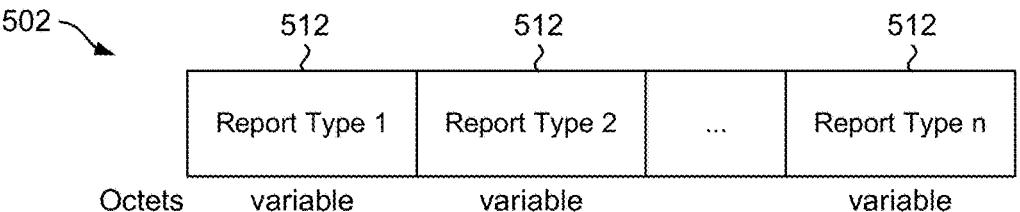
FIG. 17 is a schematic diagram showing the structure of the List of Report Types field of the sensing-measurement-setup request frame shown in FIG. 16, according to some embodiments of this disclosure.
Figure 18:
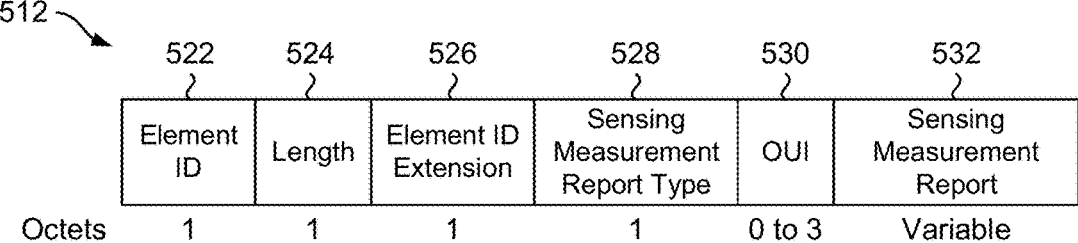
FIG. 18 is a schematic diagram showing the structure of the Report Type subfield of the List of Report Types field shown in FIG. 17, according to some embodiments of this disclosure.

FIG. 17 is a schematic diagram showing the structure of the List of Report Types field 502 of the sensing-measurement-setup request frame 440 in these embodiments. For each measurement report, the List of Report Types field 502 comprises one or more Report Type subfields 512, each of which is similar to that defined in IEEE 802.11bf but may be used for specifying both the default report type and vendor-specific report types. More specifically, as shown in FIG. 18, each Report Type subfield 512 comprises a plurality of items, including an element ID item 522 for storing a unique ID of the Report Type subfield 512, a Length item 524 for indicating the length of the Report Type subfield 512, an Element ID Extension item 526 as defined in IEEE 802.11bf for extending the number of defined IEEE 802.11 elements, a Sensing Measurement Report Type item 528 similar to the Sensing Measurement Report Type subfield 468 shown in FIG. 13, an optional OUI item 530 storing the vendor's OUI, and a Sensing Measurement Report item 532. The Sensing Measurement Report Type item 528 is similar to the 468 shown in FIG. 13 and may have the values shown in Table 1 (for example, having the value zero (0) for indicating the default CSI report type or value seven (7) for indicating a single vendor-specific report type). For example, while the Sensing Measurement Report Type item 528 has eight (8) bits, the three (3) least significant bits (LSB) or the three (3) most significant bits (MSB) or any other three suitable bits make take the value between zero (0) to seven (7) as described above and other bits are not used. The OUI item 530 is similar to the OUI item 486 shown in FIG. 14, and the Sensing Measurement Report item 532 is similar to the Vendor-Specific subfield 488 shown in FIG. 14.

When the Sensing Measurement Report Type item 528 has the value zero (0), the Report Type subfield 512 does not have the OUI item 530 and the Sensing Measurement Report item 532. When Sensing Measurement Report Type item 528 has the value seven (7), the Report Type subfield 512 has the OUI item 530 storing the vendor's OUI, and the Sensing Measurement Report item 532 storing the vendor-specific report type associated with the vendor's OUI.

Figure 19:
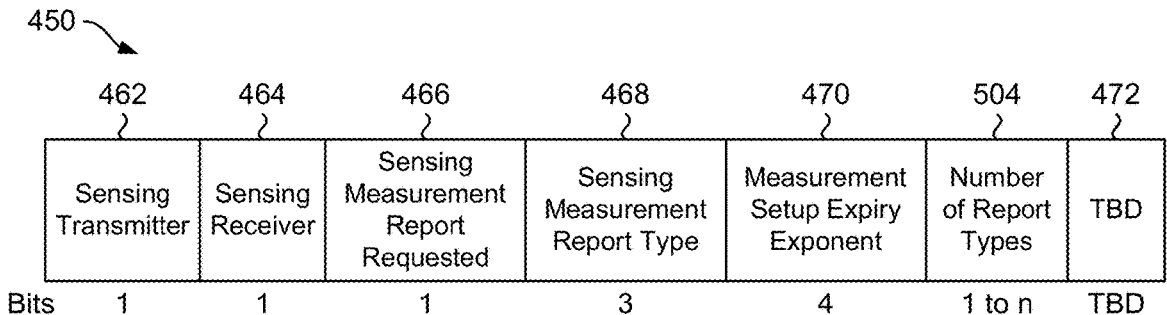
FIG. 19 is a schematic diagram showing the structure of the Sensing Measurement Parameters field of the sensing-measurement-setup request frame shown in FIG. 16, according to some embodiments of this disclosure.

FIG. 19 is a schematic diagram showing the structure of the Sensing Measurement Parameters field 450 of the sensing-measurement-setup request frame 440 and/or the sensing-measurement-setup response frame 480 in these embodiments. The sensing measurement parameters field 450 in these embodiments is similar to that shown in FIG. 13 except that the Sensing Measurement Parameters field 450 in these embodiments further comprises a Number of Report Types subfield 504 (one or more bits) with the value thereof indicating the number count of report types in the list that is encoded in the List of Report Types field 502 of the sensing-measurement-setup request frame 440.

More specifically, in some embodiments, if one or more report types are included in the List of Report Types field 502 of the sensing-measurement-setup request frame 440, the value of the Number of Report Types subfield 504 is the number of report types that are specified in the List of Report Types field 502. If no report types is included in the List of Report Types field 502 of the sensing-measurement-setup request frame 440 (meaning that, for example, a default report type will be used), the value of the Number of Report Types subfield 504 is set to zero (0).

Table 2 shows the Sensing Measurement Report Type subfield 468 in these embodiments, wherein values 0-5 correspond to those listed in IEEE 802.11bf, Table 9-401r (with value zero (0) indicating CSI, and values 1-5 reserved), value 6 indicates that multiple report types are present, and value 7 indicates the use of a vendor-specific report. Of course, in some other embodiments, other suitable values (such as any two of the reserved values 1 to 5) may be used for indicating the inclusion of multiple report types and the use of a vendor-specific report.

TABLE 2

| Sensing Measurement Report Types | |
|---|---|
| Value | Sensing Measurement Type |
| 0 | CSI |
| 1-5 | Reserved |
| 6 | Multiple Report |
| 7 | Vendor-Specific |

In some other embodiments, the Number of Report Types subfield 504 may be a one-bit subfield. The value of the Number of Report Types subfield 504 is set to zero (0) if no report type is included in the List of Report Types field 502 of the sensing-measurement-setup request frame 440. However, if one or more report types are included in the List of Report Types field 502 of the sensing-measurement-setup request frame 440, the value of the Number of Report Types subfield 504 is set to one (1), and the actual number of report types is included in another predefined subfield such as the Sensing Measurement Report Type subfield 468.

In some embodiments, the Sensing Measurement Parameters field 450 does not comprise a separate Number of Report Types subfield 504. Rather, the number of report types may be included in the "TBD" subfield 472.

In these embodiments, the sensing-measurement-setup request frames 480 is similar to that shown in FIG. 15 except that the sensing-measurement-setup request frames 480 in these embodiments may comprise a plurality of Vendor-Specific Report Sub-Element field 452.

With the above-described structures, the sensing-measurement-setup frames 440 and 480 in these embodiments allow sensing nodes to exchange a list of sensing-measurement reports including the IEEE 802.11bf default and vendor-specific reports.

While above-described structures of the sensing-measurement-setup frames 440 and 480 may be used for sensing using wireless communication signals of any suitable frequency bands, such frame structures may be particularly suitable for sub 7 GHz measurements.

In some embodiments, the vendor-specific sensing-measurement reports may be included in DMG sensing-measurement request and response frames. The message flow in these embodiments is generally the same as that shown in FIG. 11A or 11B (depending on whether to establish an associated sensing session or an unassociated sensing session). However, as the IEEE 802.11 standards define separate frame types for sub 7 GHz and DMG CSI measurements, different frames may be used for the DMG sensing measurement setup.

Figure 20:
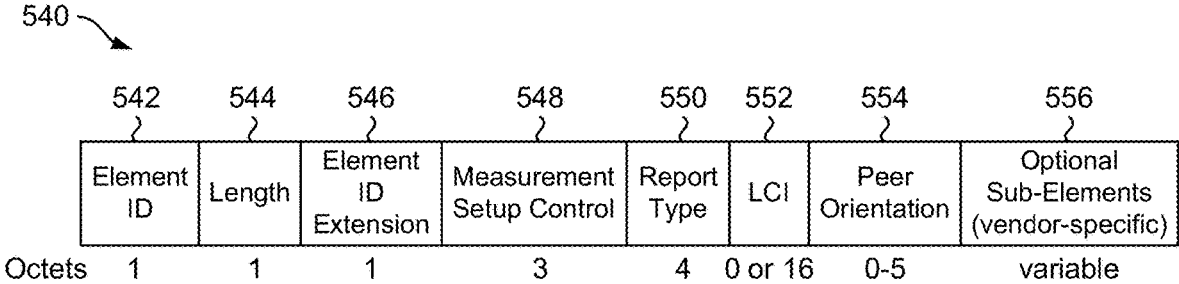
FIG. 20 is a schematic diagram showing the structure of the directional multi-gigabit (DMG) Sensing Measurement Setup Element, according to some embodiments of this disclosure.

In DMG, the sensing-measurement-setup frames 440 and 480 have the same structure and are generally denoted a DMG Sensing Measurement Setup Element. FIG. 20 is a schematic diagram showing the structure of the DMG Sensing Measurement Setup Element 540, according to some embodiments of this disclosure. In this example, the DMG Sensing Measurement Setup Element 540 is in accordance with IEEE 802.11bf, FIG. 9-1002bf with modifications.

As shown, the DMG Sensing Measurement Setup Element 540 comprises an Element ID field 542 (one (1) octet), a Length field 544 (one (1) octet) indicating the length of the DMG Sensing Measurement Setup Element 540, an Element ID Extension field 546 (one (1) octet), a Measurement Setup Control field 548 (three (3) octets), a Report Type field 550 (four (4) octets), a Location Configuration Information (LCI) field 552 (zero (0) or 16 octets), a Peer Orientation field 554 (zero (0) to five (5) octets), and an optional Sub-Elements field 556 (variable length). The Element ID field 542, Length field 544, Element ID Extension field 546, Measurement Setup Control field 548, LCI field 552, and Peer Orientation field 554 are the same as those defined in IEEE 802.11bf. The Report Type field 550 and Sub-Elements field 556 are similar to those defined in IEEE 802.11bf but with extensions as described below.

When a vendor-specific report type is required, the Report Type field 550 may be set to a predefined value for indicating inclusion of vendor-specific report types (see below), and the Sub-Elements field 556 may be included in the DMG Sensing Measurement Setup Element 540 and comprise information regarding the vendor-specific report types.

Table 3 lists the values of the Report Type field 550 of the DMG Sensing Measurement Setup Element 540, which corresponds to IEEE 802.11bf, Table 9-401y with modifications. More specifically, value 220 of the Report Type field 550 is used for indicating the inclusion of a list of a plurality of report types, and value 221 of the Report Type field 550 is used for indicating the inclusion of a single vendor-specific report type. The Sub-Elements field 556 is similar to the Vendor-Specific Sub-Elements field 452 and may have a structure as shown in FIG. 14.

TABLE 3

| Report Type subfield definition (11bf - Table 9-401y) | |
| --- | --- |
| Value | Description |
| 0 | No report |
| 1 | CSI |
| 2 | DMG Sensing Image Direction |
| 3 | DMG Sensing Image Range-Doppler |
| 4 | DMG Sensing Image Range-Direction |
| 5 | DMG Sensing Image Doppler-Direction |
| 6 | DMG Sensing Image Range-Doppler Direction |
| 7 | Target |
| 8-219 | Reserved |
| 220 | List of Report Types |
| 221 | Vendor Specific |
| 222-255 | Reserved |

Figure 21:
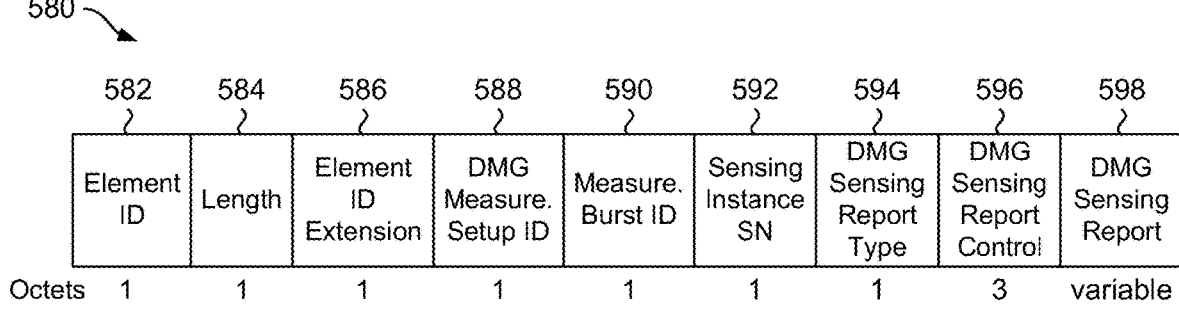
FIG. 21 is a schematic diagram showing the structure of the DMG Sensing Report element, according to some embodiments of this disclosure.

In these embodiments, DMG Sensing Report elements may be used for reporting sensing measurements which may require signaling for vendor-specific reports. FIG. 21 is a schematic diagram showing the structure of the DMG Sensing Report element 580. In this example, the DMG Sensing Measurement Setup Element 580 is in accordance with IEEE 802.11bf, clause 9.4.2.238.2 with modifications.

As shown, the DMG Sensing Report Element 580 comprises an Element ID field 582 (one (1) octet), a Length field 584 (one (1) octet) indicating the length of the DMG Sensing Report Element 580, an Element ID Extension field 586 (one (1) octet), a DMG Measurement Setup ID field 588 (one (1) octet), a Measurement Burst ID field 590 (one (1) octet), a Sensing Instance Sequence Number (SN) field 592 (one (1) octet), a DMG Sensing Report Type field 594 (one (1) octet), a DMG Sensing Report Control field 596 (three (3) octets), and a DMG Sensing Report field 598 (variable length). The Element ID field 582, Length field 584, Element ID Extension field 586, DMG Measurement Setup ID field 588, Measurement Burst ID field 590, Sensing Instance SN field 592, DMG Sensing Report Control field 596, and DMG Sensing Report field 598 are the same as those defined in IEEE 802.11bf. The DMG Sensing Report Type field 594 is similar to that defined in IEEE 802.11bf but with a new value for indicating inclusion of vendor-specific report types.

The DMG Sensing Report field 598 comprises the vendor OUI and any other parameters relevant to the vendor specific report. The DMG Sensing Report Type field 594 may have a value as in Table 3. For example, the DMG Sensing Report Type field 594 may have the value 221 for specifying that a vendor-specific report may be used. As another example, the DMG Sensing Report Type field 594 may have the value 220 for specifying that a list of vendor-specific report types are included, such that a list of standard or conventional report types and vendor-specific report types may be transmitted together.

The above-described structures of the DMG Sensing Measurement Setup Element 540 and DMG Sensing Report Element 580 allow sensing nodes to negotiate vendor-specific DMG sensing-measurement report types.

In some embodiments, a CSI quantization report may be used as a vendor-specific sensing-measurement report.

In these embodiments, after the complex channel-estimation values are obtained, the phases and magnitudes thereof are normalized. Then, the normalized phases and magnitudes of the channel-estimation values are quantized to respective bit sizes with suitable parameters (such as the maximums of the normalized phases and magnitudes, respectively), wherein the bit sizes may be standardized such that no scale-factor feedback is required. The quantized phases and magnitudes are compiled into a CSI quantization report for reporting to the sensing initiator 302. The quantization parameters may also be compiled into the CSI quantization report.

Figure 22:
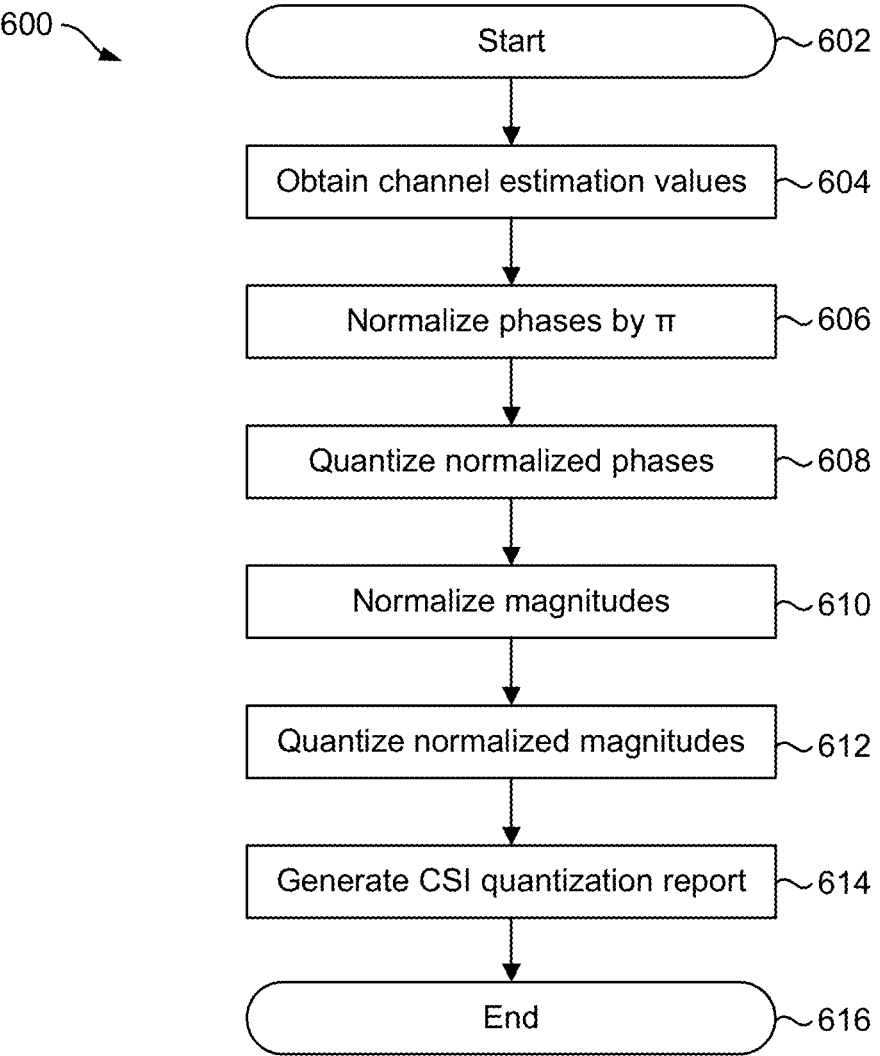
FIG. 22 is a flowchart showing an exemplary CSI-quantization procedure executed by a sensing responder shown in FIG. 9 for generating a CSI quantization report, according to some embodiments of this disclosure.

FIG. 22 is a flowchart showing an exemplary CSI-quantization procedure 600 executed by a sensing responder 304 for generating a CSI quantization report. In this example, the wireless communication signal 114 comprises OFDM symbols and the CSI-quantization procedure 600 is performed on an OFDM symbol.

After the procedure 600 starts (step 602), the sensing responder 304 obtains the channel-estimation values, for example, from a channel estimation function block (step 604). Each channel-estimation value is a complex number having a magnitude $M_i$ (wherein the subscript i represents the index of the channel-estimation value per subcarrier) and a phase $\varphi_i$. As those skilled in the art will appreciate, the magnitudes $M_i$ of the channel-estimation values are usually Rayleigh-distributed in the range between zero (0) and $M_m$, where $M_m = 2^{N_p} - 1$ is the magnitude-maximum, and $N_p$ represents the output bit-size of the channel-estimation function block, and the phases $\varphi_i$ of the channel-estimation values are usually uniformly distributed in the range between $-\pi$ and $\pi$.

At step 606, the sensing responder 304 normalizes the phase $\varphi_i$ of each channel-estimation value by the phase-maximum $\pi$ to obtain the normalized phase $\bar{\varphi}_i$ that is, $\bar{\varphi}_i = \varphi_i / \pi$, such that $-1 \leq \bar{\varphi}_i \leq 1$.

At step 608, the sensing responder 304 quantizes each normalized phase $\bar{\varphi}_i$ as:

$$\hat{\varphi}_i = \text{Round}\left(\bar{\varphi}_i (2^{N_s-1} - 1)\right) \qquad (1)$$

where $\hat{\varphi}_i$ represents the quantized phase, and $N_s$ is the quantization bit-size for quantizing the normalized phase $\bar{\varphi}_i$.

At step 610, the magnitude $M_i$ of each channel-estimation value is normalized by the magnitude-maximum $M_m$, that is, $\bar{M}_i = M_i / M_m$, such that $0 \leq \bar{M}_i \leq 1$.

At step 612, the sensing responder 304 quantizes each normalized magnitude $\bar{M}_i$ as:

$$\hat{M}_i = \text{Round}\left(\bar{M}_i (2^{N_b} - 1)\right) \qquad (2)$$

where $\hat{M}_i$ represents the quantized magnitude, and $N_b$ is the quantization bit-size for quantizing the normalized magnitude $\bar{M}_i$.

At step 614, the sensing responder 304 generates the CSI quantization report comprising the normalized phases $\bar{\varphi}_i$ and normalized magnitudes $\bar{M}_i$, and sends the CSI quantization report to the sensing initiator 302. In some embodiments, the CSI quantization report may also comprise necessary parameters such as the phase-quantization bit-size $N_s$ and the magnitude-quantization bit-size $N_b$.

The CSI-quantization procedure 600 is then completed (step 616).

As those skilled in the art will appreciate, some parameters such as the phase-quantization bit-size $N_s$ and the magnitude-quantization bit-size $N_b$ may be specified or otherwise defined in relevant standards, and some other parameters such as the output bit-size $N_p$ of the channel-estimation function block may be a vendor-specific parameter. In some embodiments, an extra normalization procedure between the channel estimation function block and the CSI quantization function block may be required to set the value of the vendor-specific parameter $N_p$ to a standardized value $N_r$; see, for example, U.S. patent application Ser. No. 18/134,743 filed on Apr. 14, 2023, the content of which is incorporated herein by reference in its entirety.

In these embodiments, the CSI quantization report facilitates the negotiation as a vendor-specific option.

In above description, various embodiments are described with respect to IEEE 802.11bf. In some alternative embodiments, the wireless systems, apparatuses, and methods described herein may be used with respect to other sensing-related standards such as IEEE 802.15.4ab, ultra wide band (UWB) sensing standards, and/or cellular sensing standards.

In above description, various embodiments are disclosed as examples of wireless systems, apparatuses, and methods using coordinated transmissions between multiple access points for providing WLAN vendor-specific sensing reports, such as:

methods for setting up, performing, and reporting vendor-specific sensing measurements, suitable for sub 7 GHz and DMG;

methods for sensing session report negotiation between an AP 102 and a STA 112;

sensing measurement setup frames suitable for setting up vendor-specific sensing measurements;

a predefined value (such as value 7) of sensing measurement report type allowing vendor-specific or proprietary extensions;

methods for generating CSI sensing measurement reports for sensing using wireless communication signals.

The wireless systems, apparatuses, and methods disclosed herein provide various benefits such as:

The methods for sensing session report negotiation allow sensing STAs 112 to negotiate vendor-specific sensing measurement report types with peer sensing stations (such as other STAs 112 and/or APs 102), thereby providing flexibility for sensing reporting.

The sensing-measurement-setup request frame 440 and the sensing-measurement-setup response frame 480 allow the sensing nodes to easily exchange vendor-specific sensing-measurement reports.

The sensing-measurement-setup frames 440 and 480 allow sensing nodes to exchange a list of sensing-measurement reports including the IEEE 802.11bf default and vendor-specific reports.

The DMG Sensing Measurement Setup Element and DMG Sensing Report Element allows sensing nodes to negotiate vendor-specific DMG sensing-measurement report types.

The CSI quantization report facilitates the negotiation as a vendor-specific option.

Those skilled in the art will appreciate that the above-described method may be implemented in any suitable manner, for example, as computer-executable instructions stored in one or more non-transitory computer-readable storage media, as one or more modules having one or more circuits for performing the above-described method, in one or more chipsets having one or more circuits for performing the above-described method, in one or more devices or apparatuses having one or more circuits for performing the above-described method, and/or the like.

Although embodiments have been described above with reference to the accompanying drawings, those of skill in the art will appreciate that variations and modifications may be made without departing from the scope thereof as defined by the appended claims.

What is claimed is:

1. A computerized method comprising:
transmitting a signal for broadcasting a multiple-report-type-support capability;
receiving from a device a first request having an indication of the multiple-report-type-support capability;
sending to the device a first response having a confirmation of the multiple-report-type-support capability;
exchanging information with the device for selecting a report type from one or more sensing-measurement report types; and
receiving from the device one or more sensing-measurement reports generated using the selected report type;
wherein the one or more sensing-measurement report types comprise at least one first sensing-measurement report type associated with a unique identifier (ID), and a second sensing-measurement report type unassociated with any ID.

2. The method of claim 1, wherein said exchanging information with the device for selecting the report type comprises:
sending a request frame, the request frame comprising the one or more sensing-measurement report types; and
receiving a response frame, the response frame comprising the report type selected from the one or more sensing-measurement report types.

3. The method of claim 2, wherein the one or more sensing-measurement report types comprise a channel state information (CSI) quantization report generated by the device using a procedure comprising:
obtaining channel estimation values;
normalizing phases of the channel estimation values by $\pi$;
quantizing normalized phases;
normalizing magnitudes of the channel estimation values by a magnitude maximum; and
quantizing normalized magnitudes.

4. The method of claim 2, wherein the request frame comprises a first field, the first field comprising a first predefined value for indicating inclusion of the one or more sensing-measurement report types in the request frame.

5. The method of claim 4, wherein the request frame comprises a second field, and the second field comprises:
the one or more sensing-measurement report types,
a first ID having a second predefined value,
a length subfield for indicating the length of the second field, and
the unique ID.

6. An apparatus comprising:
one or more processors; and
a memory storing instructions which, when executed by the one or more processors, cause the apparatus to perform actions comprising:
transmitting a signal for broadcasting a multiple-report-type-support capability;

receiving from a device a first request having an indication of the multiple-report-type-support capability;
sending to the device a first response having a confirmation of the multiple-report-type-support capability;
exchanging information with the device for selecting a report type from one or more sensing-measurement report types; and
receiving from the device one or more sensing-measurement reports generated using the selected report type;
wherein the one or more sensing-measurement report types comprise at least one first sensing-measurement report type associated with a unique identifier (ID), and a second sensing-measurement report type unassociated with any ID.

7. The apparatus of claim 6, wherein the first request is a probe request defined based on an IEEE 802.11 standard, and the first response is a probe response defined based on the IEEE 802.11 standard.

8. The apparatus of claim 6, wherein said exchanging information with the device for selecting the report type comprises:
sending a request frame, the request frame comprising the one or more sensing-measurement report types; and
receiving a response frame, the response frame comprising the report type selected from the one or more sensing-measurement report types.

9. The apparatus of claim 8, wherein the one or more sensing-measurement report types comprise a channel state information (CSI) quantization report generated by the device using a procedure comprising:
obtaining channel estimation values;
normalizing phases of the channel estimation values by $\pi$;
quantizing normalized phases;
normalizing magnitudes of the channel estimation values by a magnitude maximum; and
quantizing normalized magnitudes.

10. The apparatus of claim 6, wherein the request frame comprises a first field, the first field comprising a first predefined value for indicating inclusion of the one or more sensing-measurement report types in the request frame.

11. The apparatus of claim 10, wherein the request frame is a Sensing Measurement Setup Request frame defined based on an IEEE 802.11 standard, and the response frame is a Sensing Measurement Setup Response frame defined based on the IEEE 802.11 standard;
wherein the first field is a Sensing Measurement Parameters field defined based on the IEEE 802.11 standard; and
wherein the first predefined value is a value of a Sensing Measurement Report Type subfield of the Sensing Measurement Parameters field.

12. The apparatus of claim 10, wherein the request frame comprises a second field, and the second field comprises:
the one or more sensing-measurement report types,
a first identifier (ID) having a second predefined value,
a length subfield for indicating the length of the second field, and
the unique ID.

13. The apparatus of claim 12, wherein the second field further comprises one or more subfields, each of the one or more subfields comprising:
a second ID;
a length item for indicating the length of the subfield;
a Sensing Measurement Report Type item; and a Sensing Measurement Parameters.

14. The apparatus of claim 13, wherein the first field further comprises a number count of the one or more subfields of the second field.

15. One or more non-transitory, computer-readable storage media comprising computer-executable instructions, wherein the instructions, when executed, cause at least one processing unit to perform the method of claim 1.

16. The one or more non-transitory, computer-readable storage media of claim 15, wherein said exchanging information with the device for selecting the report type comprises:

sending a request frame, the request frame comprising the one or more sensing-measurement report types; and receiving a response frame, the response frame comprising the report type selected from the one or more sensing-measurement report types.

17. The one or more non-transitory, computer-readable storage media of claim 16, wherein the request frame comprises a first field, the first field comprising a first predefined value for indicating inclusion of the one or more sensing-measurement report types in the request frame.

18. A computerized method comprising:

receiving, from a device, a signal that broadcasts a multiple-report-type-support capability;

transmitting to the device a first request having an indication of the multiple-report-type-support capability;

receiving from the device a first response having a confirmation of the multiple-report-type-support capability;

exchanging information with the device for selecting a report type from one or more sensing-measurement report types; and transmitting to the device one or more sensing-measurement reports generated using the selected report type;

wherein the one or more sensing-measurement report types comprise at least one first sensing-measurement report type associated with a unique identifier (ID), and a second sensing-measurement report type unassociated with any ID.

19. An apparatus comprising:

one or more processors; and a memory storing instructions which, when executed by the one or more processors, cause the apparatus to perform the method of claim 18.

20. One or more non-transitory, computer-readable storage media comprising computer-executable instructions, wherein the instructions, when executed, cause at least one processing unit to perform the method of claim 18.

* * * * *